United States Patent [19]

Giusto

[11] Patent Number: 4,538,111
[45] Date of Patent: Aug. 27, 1985

[54] CIRCUIT RECOVERING THE CARRIER OF A SIGNAL AMPLITUDE AND PHASE MODULATED BY DIGITAL SIGNALS

[75] Inventor: Pietro P. Giusto, Turin, Italy

[73] Assignee: CSELT Centro Studi e Laboratori Telecomunicazioni SPA, Turin, Italy

[21] Appl. No.: 423,086

[22] Filed: Sep. 24, 1982

[30] Foreign Application Priority Data

Nov. 12, 1981 [IT] Italy ............................. 68462 A/81

[51] Int. Cl.$^3$ ............................................. H03D 3/00
[52] U.S. Cl. ..................................... 329/122; 329/50; 329/135; 375/86
[58] Field of Search ................. 329/50, 104, 107, 109, 329/122, 124, 135, 136; 375/42, 76, 80, 83, 84, 85, 86, 87, 94, 98, 120

[56] References Cited

U.S. PATENT DOCUMENTS

| | | | |
|---|---|---|---|
| 3,970,946 | 7/1976 | Matsuo | 329/135 X |
| 4,100,499 | 7/1978 | Monrolin | 329/50 |
| 4,352,193 | 9/1982 | Acker | 375/76 |
| 4,355,402 | 10/1982 | Kromer, III et al. | 375/98 X |
| 4,404,532 | 9/1983 | Welti | 329/135 X |

Primary Examiner—Eugene R. LaRoche
Assistant Examiner—Robert J. Pascal
Attorney, Agent, or Firm—Karl F. Ross; Herbert Dubno

[57] ABSTRACT

An apparatus for the recovery of an amplitude-modulated and phase-modulated signal wherein the signal is multiplied by two correction and adjustment signals in phase-quadrature in a pair of multipliers connected in low-pass filters to the sample and decision circuit. The output of the latter is an error signal which represents the phase error of the recovered carrier obtained by the comparison made between the baseband components of the demodulated signal and suitable decision thresholds at a decision instant estimating transmitted digital symbols. A logic circuit is connected to the output of the sample and decision circuit and delivers its output to a pulse generator whose correction train of pulses is filtered before being applied to a voltage-controlled oscillator whose output is applied directly to one of the multipliers and through a quadrature-phase shifter to the other.

1 Claim, 4 Drawing Figures

4,538,111

CIRCUIT RECOVERING THE CARRIER OF A SIGNAL AMPLITUDE AND PHASE MODULATED BY DIGITAL SIGNALS

FIELD OF THE INVENTION

My present invention relates to digital-signal transmission and, more particularly, to a circuit for recovering the carrier of the received signal in the case of phase- and amplitude-modulated signals.

BACKGROUND OF THE INVENTION

The coherent demodulation of digital signals, transmitted by phase modulation and/or amplitude modulation of a carrier, required the generation, on reception, of a reference signal that is phase and frequency coherent with said carrier.

The most widely used amplitude and phase modulation systems do not allow an immediate extraction of said phase and frequency reference signal, because the transmitted signals do not generally contain any spectral component directly correlated with the carrier.

The known systems allowing the extraction of the correct phase reference for such signals are generally based on three different operations.

A first mode of operation consists in multiplying the received-signal frequency by a factor N such that all the products $N.\Delta i$ (where $\Delta i$ are all the possible phase differences in degrees among the various states the modulated carrier can assume) are multiples of 360°. This technique cannot be practically applied when the carrier of the signal to be modulated has a very high frequency and when differences $\Delta i$ exist which require a high multiplication coefficient N.

A second mode of operation which can recover the received-signal carrier consists in the received-signal remodulation by a suitable sequence of digital signals, obtained from the same received signal, so as to annul the modulating component of the received signal. This operation needs complex circuits requiring a modulator, delay lines and logic circuits for the generation of the remodulation signal. In addition the errors in transmitted-signal estimate, depending on which the sequence of signals for the remodulation is generated, generate remodulation errors, thus degrading the system performance.

Finally, there is a mode of operation which is based on carrying out linear and non-linear operations on the received-signal baseband components. These components are obtained by filtering the result of the multiplications of the received signal by two references in phase-quadrature with each other.

The phase and frequency of these references under steady condition will be coherent with the frequency and phase of the received-signal carrier.

This method requires very complex circuits when the modulation used has a high number of states.

In these cases to reduce the circuit complexity, simplifications are generally used which degrade the system performance.

In addition, a number of these techniques cannot be efficiently used when the signalling frequency is very high.

All the above-listed methods are, moreover, sensitive to so-called "pattern" noise, due to the well-known intersymbol interference which generally is very high. It is known that in the case of digital signals the signal-to-noise ratio and the intersymbol interference are optimized only at the decision instants at which the transmitted digital-symbol is estimated.

OBJECTS OF THE INVENTION

It is an object of the invention to obviate the above-stated disadvantes by a method of and device for the recovery of the carrier based on the received-signal baseband processing effected at the decision instants.

Another object is to provide a method which can be generally applied, by suitable adjustments, to all modulation systems and does not require any multiplication operations of the received modulated signal, or any remodulation, or complex linear and non-linear operations on baseband signals.

SUMMARY OF THE INVENTION

These objects and others which will become apparent hereinafter are attained with a method which consists in making the comparison, at the decision instants, between the amplitude either of the received-signal baseband components, or of their linear combinations, and suitable thresholds, added to the usual decision thresholds provided for the recovery of the transmitted digital information.

The method of the invention is for the recovery of the carrier of a signal, amplitude and phase-modulated by digital signals, in a coherent demodulation system which reconstructs the baseband components of the modulating signal by multiplying the modulated signal by two-components, in phase quadrature with respect to each other, of a signal generated by a controlled local oscillator and assumed as a recovered carrier, said two baseband components of the modulating signal being apt to be represented by modulus and sign on a Cartesian plane (signal plane), and forming the geometric representation of the received signal. In this method, a phase-error estimate of the recovered carrier is effected by making a comparison between the position of the signal received in the signal plane and a predetermined number of decision thresholds duly positioned in said signal plane. This comparison is effected at the decision instant usually used to estimate the transmitted digital symbols. The decision thresholds subdivide the signal plane into three classes of regions, a first class comprising the points where the received signal can be found when there is a positive-sign phase error in the recovered carrier, a second class comprising the points where the received signal can be found when there is a negative-sign phase-error in the recovered carrier, and a third class comprising the points where the received signal can be found when no phase error exists in the recovered carrier. The first and second of said classes comprise a predetermined number of regions in relation with the magnitude of the phase error of the recovered carrier. The inclusion in one of said classes and regions is univocally denoted by a digital symbol which is utilized to generate a control signal for the local oscillator.

The position of the decision thresholds on the signal plane is adaptatively adjusted, with respect to the amplitude of the signal received, by a signal generated as a result of the position error estimate of said thresholds with respect to the ideal position, the estimate being effected on the basis of said digital symbol as a result of the comparison between the position of the received signal and the decision thresholds.

The processing of the signals obtained from said comparison can be effected by simple analog or logic circuits, so that the device of the present invention, can be used regardless of the carrier frequency of the received signal and up to the highest signalling frequency values allowed by the present technology.

In addition, with this carrier recovery signal a circuit can be conveniently associated for the threshold decision position regulation. This circuit uses the same signals used for the carrier recovery, but with a different processing.

The regulation of the position of the decision thresholds is in fact required in multi-level modulation systems in order to avoid a degradation of the system performances depending on the attenuation variations which the signal undergoes along the communications channel.

Hereinafter the operating principle of the present invention will be described in a simplified way, but including the circuit regulating the threshold positions with reference to 40-PSK modulation systems. Two simplified examples of application to 80-PSK and 16-QAM modulation will be briefly described to indicate how the principle can be differently adapted to the chosen modulation.

A circuit for the recovery of the carrier of a signal, amplitude and phase modulated by digital signals for carrying out the method of the invention comprises a multi-threshold sample and a decision circuit is provided apt to make the comparison, at the instants determined by a circuit for the symbol synchronism recovery, between the amplitude of the baseband components of the modulating signal (or of linear combination of these components), obtained by means of multiplications, made by multipliers followed by low-pass filters of the signal received by two components in phase quadrature generated by a controlled local oscillator and the thresholds of said sample and decision circuit, the sample and decision circuit emitting at the output towards a first logic circuit of the combinatory type, at each carried out comparison, a digital symbol. The first logic circuit estimates, depending on said digital symbol, the phase error or the recovered carrier and controls a first pulse generator which emits a correction pulse. The sequence of the correction pulses, after a suitable low-pass filtering, forms the control signal of the local oscillator.

The position of the thresholds of the sample and decision circuit is controlled by an adjustment signal obtained, after a suitable low-pass filtering, by a second pulse generator, controlled by a second logic circuit of the combinatory type. The second logic circuit estimates the positioning errors of the decision thresholds with respect to the ideal position on the basis of the digital symbols that the sample and decision circuit emits at the output at each comparison carried out.

BRIEF DESCRIPTION OF THE DRAWING

Further features of the present invention will become apparent from the following description, reference being made to the accompanying drawing in which.

SPECIFIC DESCRIPTION

Figure 1:
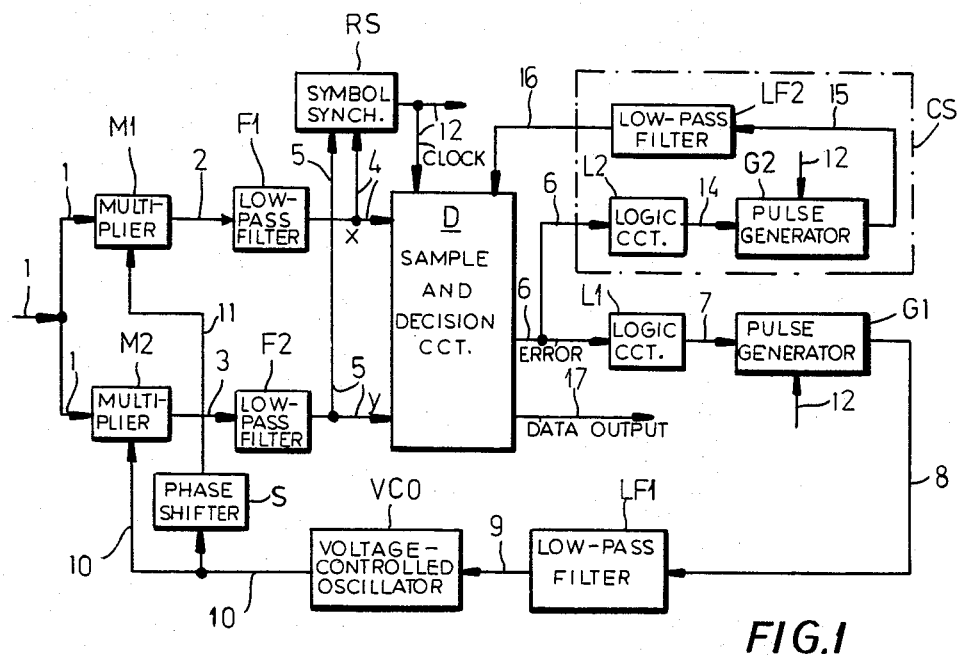
FIG. 1 is a block diagram of the circuit recovering the carrier and adjusting the decision thresholds.

In FIG. 1, the signal to be demodulated, the carrier of which is to be recovered, is present on wire 1. Said signal is multiplied in a mixer M2 by a reference signal coming, on wire 10, from a voltage-controlled oscillator VCO and assumed to be a recovered carrier. Devices such as mixer M2 and voltage-controller oscillator VCO are well known in the art.

The same signal present on wire 1 is multiplied in a mixer M1, analogous to mixer M2, by a reference signal delivered by wire 11, coherent with the signal present on wire 10, but 90° phase shifted with respect to it. As a matter of fact the signal present on wire 11 is obtained from the signal present on wire 10 by means of a conventional phase shifter S, which introduces a 90° phase shift.

The signals outgoing from M1 to M2, on wires 2 and 3 respectively are filtered by conventional low-pass filters F1, F2 respectively, which eliminate unwanted frequency components. The demodulated-signal baseband components outgoing from filters F1 and F2 are present on wires 4 and 5 respectively.

In FIG. 1 references RS denotes a usual symbol-synchronism recovery circuit. In the scheme of the example of embodiment shown in FIG. 1, RS recovers the symbol-synchronism by processing the baseband signals present on wires 4 and 5. It is apparent that any method can be used for the synchronism recovery.

It has to be kept in mind that once the symbol synchronism is recovered, the sampling instant becomes known at which, in each symbol interval, the transmitted digital symbol is to be estimated. This instant is scanned by the symbol-synchronism recovery circuit the signal emitted by RS on wire 12.

Figure 2:
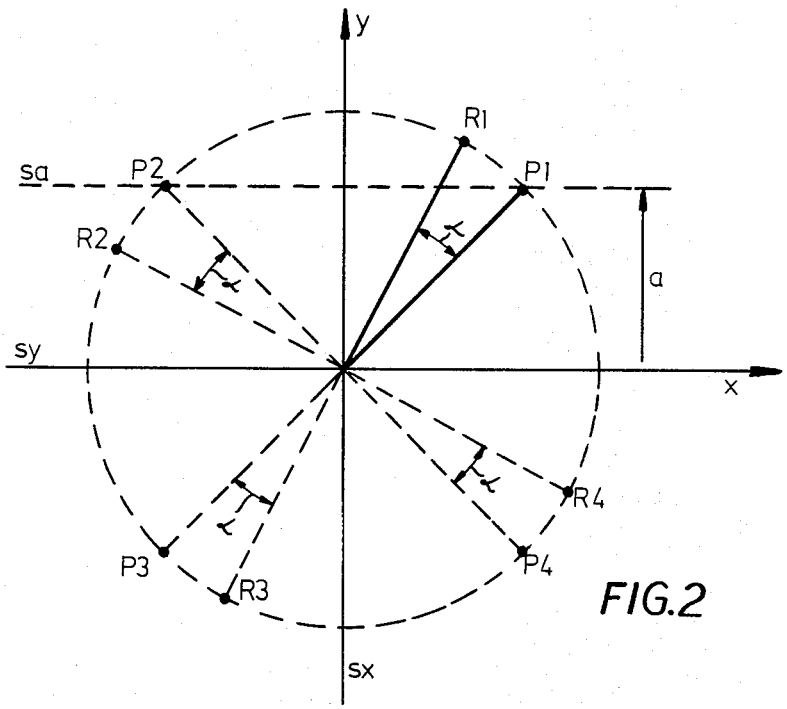
FIG. 2 represents the signal plane for the 4-phase PSK modulation.

D denotes a conventional sample and decision circuit with a plurality of thresholds subdividing the signal plane of FIG. 2 into suitable regions. If the amplitudes of the signals present on wires 4 and 5 respectively at the sampling instant are denoted by x and y, the circuit D compares x and y, or their linear combinations, with their thresholds to establish in which of the regions delimited by said thresholds the coordinate point (x, y) can be found and sends said comparison result to a logic circuit L1 through connection 6.

The sample and decision circuit D emits also at the output, on connection 17, the results of the comparisons effected in the form suited to the decoding of the transmitted digital symbols, which decoding can be effected by conventional circuit which are known to the person skilled in the art and are not the subject of the present invention.

L1 is a usual logic circuit of the combinatory type apt to carry out logic functions, which will be examined hereinafter, namely the phase error estimate of the recovered carrier.

As a consequence of this estimate, logic circuit L1 enables through connection 7, a conventional pulse generator G1 to generate a pulse which will be used for the correction of the detected phase error.

Both the sign and the amplitude of the pulses emitted by pulse generator G1, at the time instants scanned by the signal coming from RS on wire 12, are determined by the signal coming from logic circuit L1 through connection 7.

The pulses generated by pulse generator G1, emitted on wire 8, are filtered by a low-pass filter LF1 and, through wire 9, arrive at the voltage controlled oscillator VCO duly correcting the frequency and then the phase of the signal emitted by VCO on wire 10.

Hereinafter, for simplicity of description, reference will be made to a 40-PSK signal which consists of a carrier which can assume four distinct phase states which are 90° equally spaced.

The states of the signal at the sampling instant can be represented in a plane (signal plane) by plotting on two cartesian axes the amplitudes x and y as in FIG. 2.

In FIG. 2, points P1, P2, P3, P4 represent the four possible states of the 40-PSK signal under ideal demodulation conditions, i.e. when the reference signal, emitted by voltage controlled oscillator VCO on wire 10 (FIG. 1), and the carrier of the signal received on wire 1 have the desired phase relation.

In FIG. 2, references R1, R2, R3, R4 represent in the signal plane the four possible states of the 40-PSK signal received when the reference signal is shifted by an angle α(phase error) with respect to the ideal value.

Reference sx denotes the decision threshold of a 40-PSK receiver and, generally used to descriminate the sign of the component x. Analogously sy denotes the decision threshold usually used to discriminate the sign of component y.

Reference sa on the contrary denotes a supplementary threshold to discriminate the y amplitude. In this particular example the threshold sa coincides with the straight line joining points P1 and P2, which is distant from sy by the magnitude a.

The principle according to which the sign of the phase-error α is correlated with amplitudes x and y is the following: if, for example, y<a and x>0 (where y>0) or if y<a and x<0 the sign of α is positive. On the contrary, if y>a and x<0 or if y<a and x>0 the sign of α is negative.

Let Lx, Ly and La denote 3 logic variables defined as follows:

$$Lx = \begin{cases} 1 \text{ if } x > 0 \\ 0 \text{ if } x \leq 0 \end{cases}$$

$$Ly = \begin{cases} 1 \text{ if } y > 0 \\ 0 \text{ if } y \leq 0 \end{cases}$$

$$La = \begin{cases} 1 \text{ if } y > a \\ 0 \text{ if } y \leq a \end{cases}$$

Logic variables are thus defined:

$$LP = Ly \text{ AND } (La \oplus Lx)$$

$$Ln = Ly \text{ AND } ((NOT (La)) \oplus Lx) \quad (2)$$

where the symbol ⊕ denotes the 2 modulus sum, or the "EXCLUSIVE OR" operation.

The logic values of variables Lx, Ly and La are determined by the sample and decision circuit D (FIG. 1) on the basis of the result of the comparison this circuit D makes between signal x and the threshold sx as well as between signal y and thresholds sy and sa.

The sample and decision circuit D sends the logic values Lx, Ly and La to Ll; Ll calculates the logic values Lp and Ln.

The logic values of Lp and Ln are sent to the pulse generator G1 through connection 7. By supposing that positive sign pulses emitted by pulse generator G1 have the result of correcting negative phase errors and vice versa, G1 will emit a positive-sign pulse when Lp=1 and will emit a negative-sign pulse when Ln=1.

It is worth noting that owing to the way in which Lp and Ln are defined in variable definitions (1) and (2), the case in which Lp and Ln assume at the same time the value "1" cannot take place.

However Lp and Ln may simultaneously assume the value "0". In the symbol intervals in which this event may occur, pulse generator G1 emits no pulse.

When pulse generator G1 emits no pulse, y has negative value. In fact, to make the description simpler, no threshold has been provided for discriminating the amplitude of y with respect to the straight line passing through points P3 and P4 of FIG. 2.

Yet the person skilled in the art can easily embody the logic which operates both with other discriminating thresholds differently arranged on the signal plane and with a combination of the results obtained from the simultaneous comparison of x and y, and their possible linear combinations with different supplementary thresholds.

Up to now the logic has been defined which decides whether pulse generator G1 has to generate a pulse for the phase correction and what sign the generated pulse ought to have.

In the case in which different discrimination thresholds are used, the amplitude of the pulses generated by pulse generator G1 is made correspondent to the regions in which the signal plane (FIG. 2) is subdivided by the different thresholds.

In the particular case described here, by operating with a single threshold, the absolute value of the pulses generated by pulse generator G1 (FIG. 1) is only one.

As already said, the pulses generated by pulse generator G1 are sent through wire 8 (FIG. 1) to the low-pass filter LF1. The signal outgoing from said filter LF1 on wire 9 controls the frequency of the oscillator VCO.

The dimensioning of the parameters of the voltage controlled oscillator VCO and LF1 does not present any difficulty to the person skilled in the art and it must anyway be effected for each particular system, depending on the requirements relating to locking field, noise rejection, acquisition times, etc.

Generally in practice the amplitude of the received signals is not exactly known, therefore in order to correctly position the decision thresholds on the signal plane, the nominal value of this amplitude must be determined by suitable detecting circuits which are well known to the skilled in the art.

By such circuits, the received-signal amplitude estimate is used to regulate the discrimination threshold position.

However, the results of the comparisons made by the sample and decision circuit D can be used to generate a signal for adjusting the position of the decision thresholds. Hereinafter the principle will be described with reference to the particular example of the embodiment already described relative to how the signal for adjusting the positioning of the threshold sa (FIG. 2) can be obtained, by using, by means of a circuit such as the one denoted by CS in FIG. 1, the result of the comparison between the amplitude y and the threshold sa itself.

In CS, reference L2 denotes a conventional logic circuit of the combinatory kind which receives at the input on connection 6 from sample and decision current D the results of the comparisons effected between x and y and its own thresholds and calculates the logic variable Lan according to the expression:

$$Lan = Ly\ NAND\ La$$

Lan takes up the logic value 1 when y is comprised between the thresholds sy and sa (FIG. 2).

The logic values of variables La and Lan are sent to a pulse generator G2 analogous to G1 through connection 14.

G2 emits a positive sign pulse when La=1, and emits a negative-sign pulse when Lan=1. La and Lan cannot have at the same time the logic value 1, owing to their definition.

When La and Lan simultaneously have logic value 0, G2 emits no pulse.

The pulse sequence generated by pulse generator G2 is sent to a low-pass filter LF2 analogous to LF1.

The signal outgoing from filter LF2 is sent to D through wire 16 for the control of the position of threshold sa.

The considerations already made on the amplitude of the pulses emitted by G1 can be repeated also for the amplitude of the pulses emitted by G2.

Figure 3:
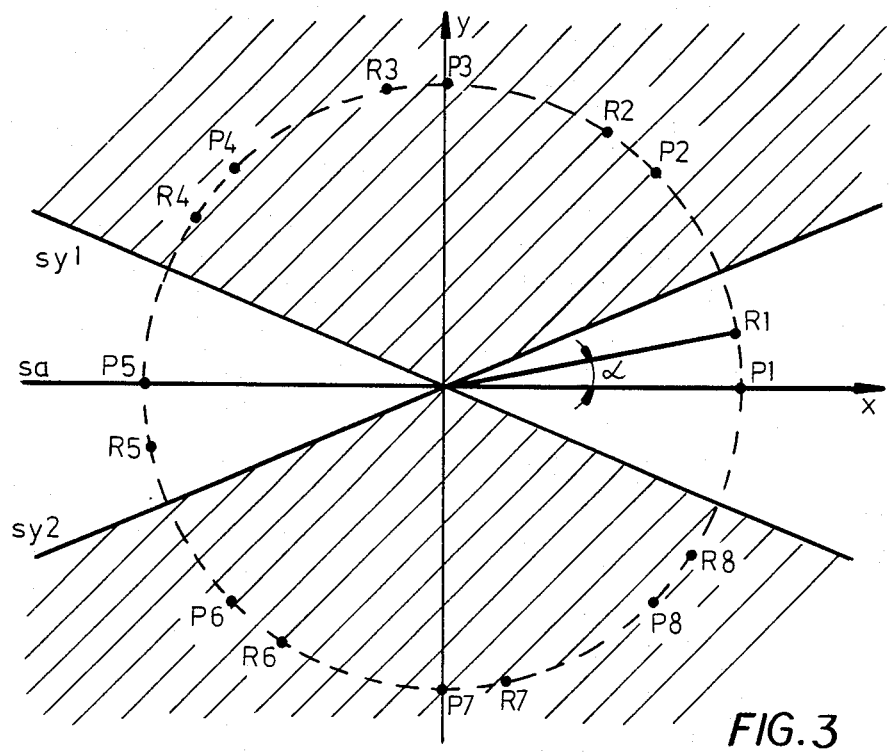
FIG. 3 shows the signal plane for 8-phase PSK modulation.
Figure 4:
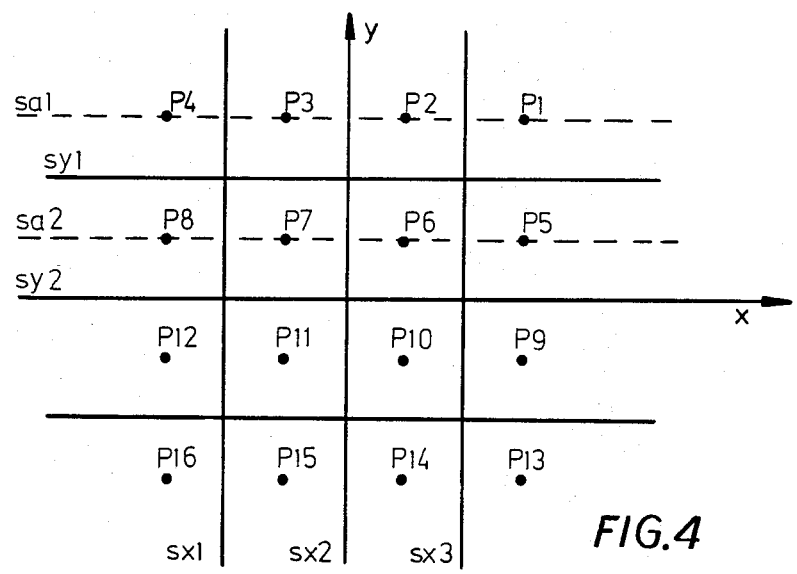
FIG. 4 represents the signal plane for 16-QAM amplitude and phase modulation.

In order to further expound the principle on which the described carrier recovery system is based, its application under its most simplified form to the case of a 80-PSK and 16-QAM signals respectively is schematically shown in FIGS. 3 and 4.

The symbols used in FIG. 3 have the same meaning as those used in FIG. 2 with the addition of points P5, P6, P7, P8 and R5, R6, R7, R8 in order to make it possible to indicate 8 possible states of the received signal and their positions in correspondence with a phase error $a$. In addition, instead of the threshold sy, two different thresholds sy1 and sy2 have been used.

In this case by simply defining logic value Ly no longer as in (1), but so that it may assume logic value 1 when the coordinate point (x, y) falls within the unshaded area of FIG. 3, and otherwise assume logic value 0, the application of the carrier recovery system is effected for the 80-PSK signal in the same way as already described for the signal depicted in FIG. 2, and in particular the same logic expressions (2) are valid.

Obviously in the case of FIG. 3 the possibilities of operating with different auxiliary thresholds rather than with the only "sa", assumed for simplicity of description are greater.

Finally FIG. 4 shows the position in the signal plane of the states of a 16-QAM system.

For simplicity sake the points whereupon the states ought to fall, in correspondence with a determined phase error, are not shown. The used symbols have a meaning analogous to that used in FIGS. 2 and 3.

A simplified way of applying the just described carrier-recovery system to the signal represented in FIG. 4 is the following.

Logic variables Ly1, La1, Ly2, La2 are defined as follows:

$$Ly1 = \begin{cases} 1 \text{ if } y > sy1 \\ 0 \text{ if } y \leq sy1 \end{cases}$$

$$La1 = \begin{cases} 1 \text{ if } y > sa1 \\ 0 \text{ if } y \leq sa1 \end{cases}$$

$$Ly2 = \begin{cases} 1 \text{ if } sy2 < y < sy1 \\ 0 \text{ if } y \leq sy2 \text{ or } y \geq sy1 \end{cases}$$

$$La2 = \begin{cases} 1 \text{ if } y \leq sa2 \\ 0 \text{ if } y \leq sa2 \end{cases}$$

Logic variable Lx maintains the definition it has been previously assigned.

In this case logic circuit L1 (FIG. 1) computes:

$$Lp1 = Ly1\ AND\ (La1 \oplus Lx)$$

$$Ln1 = Ly1\ AND\ ((NOT\ (La1)) \oplus Lx)$$

$$Lp2 = Ly2\ AND\ (La2 \oplus Lx)$$

$$Ln2 = Ly2\ AND\ ((NOT\ (La2)) \oplus Lx) \qquad (5)$$

and finally:
$$Lp = Lp1\ OR\ Lp2$$

$$Ln = Ln1\ OR\ Ln2 \qquad (6)$$

It is worth noting that points P6 and P7 can be handled by means of the threshold sa2 of FIG. 4 in exactly the same way as points F1 and P2 are handled by means of the threshold "sa" of FIG. 2.

By variables Lp and Ln so calculated, generator G1 (FIG. 1) can be controlled with the same modalities as seen in the previous examples.

Analogously the considerations made on the amplitude of the pulses generated by G1 and on the possibility of using other auxiliary thresholds for the discrimination of the amplitudes of x and y and their linear combinations may be repeated.

The logic circuit L2 of FIG. 1 can calculate the variable $$Lan = Ly\ NAND\ La1 \qquad (7)$$

and the control circuit of the positions of the discrimination thresholds on the amplitude of y can be effected in the same way as the control circuit of the position of the threshold "sa" of FIG. 2, by replacing La by La1 and taking into account the constant ratio existing among the positions of the different thresholds of FIG. 4.

Modifications and variations can be made to the carrier recovery circuit, object of the present invention without going out of the scope of the invention.

I claim:

1. An apparatus for recovery of a carrier of a signal herein referred to as recovered carrier, amplitude-modulated and phase modulated by digital signals referred to herein as modulating signal in a coherent demodulation system which reconstructs base-band components of said modulating signal, said base-band components of said modulating signal being apt to be represented by modulus and sign on a Cartesian plane (signal plane), and forming a geometric representation of said received signal, characterized in that a phase-error estimate of said recovered carrier is effected by making a comparison between position of said received signal in a signal plane and a plurality of decision thresholds duly positioned in said signal plane; said comparison being effected at a decision instant usually used to estimate transmitted digital symbols; said decision thresholds subdividing the signal plane into three classes of regions, a first class comprising points where said received signal can be found when there is a positive-sign phase error in said recovered carrier, a second class comprising points where said received signal can be found when there is a negative-sign phase-error in said recovered carrier, a third class comprising points where said received signal can be found when no phase error exists in said recovered carrier; said first and second classes comprising a pre-determined number of regions in relation with the magnitude of said phase error of said recovered carrier; the inclusion in one of said classes and regions being univocally denoted by a digital symbol which is utilized to generate a control signal for a local oscillator which comprises:

- a first and a second multiplier, each receiving as one input the modulated signal, the outputs of the multipliers being in phase quadratures;
- a pair of low-pass filters respectively connected to said outputs of multipliers;
- a sample and decision circuit receiving outputs from said filters having controllable thresholds for comparing at a selected instant, amplitudes of baseband components from said filters and producing an output;
- a first logic circuit coupled to said sample and decision circuit for estimating positioning errors of said thresholds with respect to an ideal position on the basis of the digital symbol output by said sample and decision circuit, a first pulse generator connected to and controlled by said first logic circuit, and another low-pass filter connected between said first pulse generator and said sample and decision circuit for applying said adjustment signal thereto;
- a second logic circuit connected to said output of said sample and decision circuit for receiving a digital symbol output by said sample and decision circuit and representing the phase error of the received carrier;
- a second pulse generator connected and controlled by said second logic circuit for generating a correction pulse;
- a further low-pass filter connected to said second pulse generator and filtering a sequence of correction pulses received therefrom;
- a voltage-controlled oscillator having as an output said recovered carrier which is applied as first multiplier signal to said second multiplier;
- a phase shifter connected between said output of said voltage-controlled oscillator and said first multiplier for feeding a second multiplier signal to said first multiplier which is in a phase quadrature with said first multiplier signal; and
- a symbol synchronism-recovery circuit for triggering said sample and decision circuit at said instant.

* * * * *